(12) United States Patent
Gundstrup

(10) Patent No.: US 10,001,228 B2
(45) Date of Patent: Jun. 19, 2018

(54) UNBONDED FLEXIBLE PIPE

(75) Inventor: Søren Gundstrup, Gentofte (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 411 days.

(21) Appl. No.: 14/125,349

(22) PCT Filed: May 9, 2012

(86) PCT No.: PCT/DK2012/050155
§ 371 (c)(1),
(2), (4) Date: Jan. 10, 2014

(87) PCT Pub. No.: WO2012/171530
PCT Pub. Date: Dec. 20, 2012

(65) Prior Publication Data
US 2014/0116565 A1 May 1, 2014

(30) Foreign Application Priority Data

Jun. 17, 2011 (DK) .................. 2011 00461

(51) Int. Cl.
| F16L 11/00 | (2006.01) |
| F16L 11/10 | (2006.01) |
| C22C 38/00 | (2006.01) |
| C22C 38/02 | (2006.01) |
| C22C 38/04 | (2006.01) |

(Continued)

(52) U.S. Cl.
CPC ............... *F16L 11/10* (2013.01); *C21D 9/08* (2013.01); *C22C 38/004* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *F16L 11/082* (2013.01); *F16L 11/083* (2013.01); *F16L 11/16* (2013.01)

(58) Field of Classification Search
None
See application file for complete search history.

(56) References Cited

U.S. PATENT DOCUMENTS 4,168,995 A   9/1979   Erdodi
4,549,581 A  10/1985   Unno
(Continued)

FOREIGN PATENT DOCUMENTS

DE   10 2009 030 324 A1   1/2001
EP      2 090 668 A1      8/2009
(Continued)

OTHER PUBLICATIONS

Extended European Search Report for 12 79 9778 dated Mar. 1, 2015.

(Continued)

*Primary Examiner* — Adam Krupicka
(74) *Attorney, Agent, or Firm* — Pearne & Gordon LLP

(57) ABSTRACT

The invention relates to an unbonded flexible pipe for offshore applications. The pipe comprises an inner sealing sheath defining a bore and at least one armoring layer comprising metal, wherein the metal of the armoring layer is manganese steel with a composition comprising in mass % of the total steel composition
about 9-30% manganese (Mn)
about 1-4% aluminum (Al)
about 0-6% silicium (Si)
about 0-4% copper (Cu)
about 0-4% nickel (Ni)
about 0-1% carbon (C)
the remainder is iron and impurities.

23 Claims, 2 Drawing Sheets

(51) Int. Cl.
*C22C 38/06* (2006.01)
*C22C 38/08* (2006.01)
*C22C 38/12* (2006.01)
*C22C 38/14* (2006.01)
*F16L 11/08* (2006.01)
*F16L 11/16* (2006.01)
*C21D 9/08* (2006.01)

(56) References Cited

U.S. PATENT DOCUMENTS

| | | | |
|---|---|---|---|
| 4,706,713 | A | 11/1987 | Sadamitsu |
| 5,213,637 | A | 5/1993 | Mallen Herrero |
| 5,269,349 | A | 12/1993 | Sugier |
| 5,647,922 | A * | 7/1997 | Kim .................. C22C 38/04 148/530 |
| 5,730,188 | A | 3/1998 | Kalman |
| 5,813,439 | A | 9/1998 | Herrero |
| 5,922,149 | A | 7/1999 | Mallen Herrero |
| 6,085,799 | A | 7/2000 | Kodaissi |
| 6,110,550 | A | 8/2000 | Jarrin |
| 6,123,114 | A | 9/2000 | Seguin |
| 6,192,941 | B1 | 2/2001 | Mallen Herrero |
| 6,282,933 | B1 | 9/2001 | Dupoiron |
| 6,283,161 | B1 | 9/2001 | Feret |
| 6,291,079 | B1 | 9/2001 | Mallen Herrero |
| 6,354,333 | B1 | 3/2002 | Dupoiron |
| 6,387,192 | B1 | 5/2002 | Frommeyer |
| 6,408,981 | B1 | 6/2002 | Jung |
| 6,454,897 | B1 | 9/2002 | Morand |
| 6,668,867 | B2 | 12/2003 | Espinasse |
| 6,691,743 | B2 | 2/2004 | Espinasse |
| 7,806,165 | B2 | 10/2010 | Kroos |
| 2003/0159745 | A1 | 8/2003 | Espinasse |
| 2003/0164196 | A1 | 9/2003 | Glejbol |
| 2004/0074628 | A1 * | 4/2004 | Engl .................. C21D 8/0226 164/476 |
| 2005/0229991 | A1 | 10/2005 | Hardy |
| 2006/0179638 | A1 | 8/2006 | Engl |
| 2009/0196785 | A1 | 8/2009 | Spitzer |
| 2009/0202382 | A1 | 8/2009 | Kim |
| 2009/0218093 | A1 | 9/2009 | Gudme |
| 2010/0258218 | A1 | 10/2010 | Hong |
| 2011/0162750 | A1 | 7/2011 | Marchand |

FOREIGN PATENT DOCUMENTS

| | | |
|---|---|---|
| EP | 2 228 578 A1 | 9/2010 |
| EP | 2 307 780 | 4/2011 |
| FR | 2 934 349 A1 | 7/2008 |
| WO | 00/36324 A1 | 6/2000 |
| WO | 01/61232 A1 | 8/2001 |
| WO | 01/81809 A1 | 11/2001 |
| WO | 02/42674 A1 | 5/2002 |
| WO | 03/083344 A1 | 10/2003 |
| WO | 2004/079028 A1 | 9/2004 |
| WO | 2005/061152 A1 | 7/2005 |
| WO | 2010/012896 A1 | 2/2010 |

OTHER PUBLICATIONS

"Recommended Practice for Flexible Pipe" ANSI/API Recommended Practice 17B Fourth Edition, Jul. 2008.
"Specification for Unbonded Flexible Pipe" ANSI/API Specification 17J Third Edition, Jul. 2008.
Search Report issued in Danish Patent Application No. PA 2011 00461 dated Dec. 15, 2011.

* cited by examiner

UNBONDED FLEXIBLE PIPE

TECHNICAL FIELD

The present invention concerns an unbonded flexible pipe for offshore application, for example for transporting water or aggressive fluids, such as oil and gas, e.g. from a production well to a sea surface installation.

BACKGROUND ART

Unbonded flexible pipes of the present type are for example described in the standard "Recommended Practice for Flexible Pipe", ANSI/API 17 B, fourth Edition, July 2008, and the standard "Specification for Ubonded Flexible Pipe", ANSI/API 17J, Third edition, July 2008. Such pipes usually comprise an inner liner also often called an inner sealing sheath or an inner sheath, which forms a barrier against the outflow of the fluid which is conveyed in the bore of the pipe, and one or more armoring layers. In general flexible pipes are expected to have a lifetime of at least 20 years in operation.

Examples of unbonded flexible pipes are e.g. disclosed in WO0161232A1, U.S. Pat. No. 6,123,114 and U.S. Pat. No. 6,085,799.

The term "unbonded" means in this text that at least two of the layers including the armoring layers and polymer layers are not bonded to each other. In practice the known pipe normally comprises at least two armoring layers located outside the inner sealing sheath. These armoring layers are not bonded to each other directly or indirectly via other layers along the pipe. Thereby the pipe becomes bendable and sufficiently flexible to roll up for transportation.

For many applications a pipe of the above type will need to fulfill a number of requirements. First of all the pipe should have a high mechanical strength to withstand the enormous and varying forces it will be subjected to during transportation, laying down and in operation. In particular unbonded flexible pipes for dynamic applications will be subjected to high forces. In order to sustain such high and dynamic forces the armoring layers of such pipes are usually made from high strength steels which should also have high fatigue strength. The steel is normally provided in elongate strips or wires which are helically wound on the inner side of the inner sealing sheath—in which case they are usually called carcass or on the outer side of the inner sealing sheath. Since the unbonded flexible pipes usually are very long e.g. several hundreds meters or longer, the elongate strips or wires often need to be welded. The strength of the weld needs to be sufficiently high for the desired application of the pipe, and for flexible unbounded pipe for dynamic applications the strength of a weld must normally be very high since the dynamic movement of the unbonded flexible pipe may result in high load, both static load and shock load on the individual wire/strip which eventually will damage the pipe if the welding strength is insufficient. Breaking of even one strip/wire of the unbonded flexible pipe may lead to rupture of the pipe and cannot be tolerated.

Flexible unbounded pipes of the above type will often be subjected to aggressive fluids, such as crude oil and gas comprising $H_2S$, $CO_2$ and/or sulfur compounds. It is therefore often required that the steel for the armoring layers has a good resistance against corrosion.

In order to fulfill these requirements in the prior art flexible pipes, the armoring layers or at least some of the armoring layers are usually made by high corrosion resistance and/or high strength steel composition, including carbon steel and duplex steel.

WO 2004/079028 suggests the use of a stainless steel alloy for offshore use. The steel alloy is selected due to its high corrosion resistance and good mechanical properties. A commercial product Duplex 2205 marketed by Outokumpu is an embodiment of the disclosure of WO 2004/079028. The steel alloy of WO 2004/079028 is, however, very expensive due to the high amount of expensive alloy components, such a nickel. The steel alloy of WO 2004/079028 thus comprises at least 4.9% nickel by weight.

In U.S. Pat. No. 6,282,933 it is suggested to use a work hardened metal of the steel used for the carcass in order to increase collapse strength and simultaneously maintain good shaping properties.

U.S. Pat. No. 5,213,637 suggests to use a carbon steel which is further subjected to a strain hardening for increasing corrosion resistance.

U.S. Pat. No. 6,291,079 discloses a steel for a flexible pipe which can withstand <$h_2S$. The steel is a chrome steel and the wires are produced by hot drawing such that the steel after cooling has a predominantly bainitic structure.

U.S. Pat. No. 5,922,149 suggests to use a steel for the flexible pipe armoring wires, which steel is subjected to a quenching to obtain a HRC hardness of 32 or higher and a steel structure of at least 90% martensite-bainite.

All of the above described steels generally have an acceptable combination of properties. However, these steels are generally relatively expensive and/or difficult to work with. Furthermore there is an increasing demand to increase the lifetime of the flexible, unbonded pipes, both because they are expensive to replace, but also in order to provide high safety against leaks during the long time use of the unbonded flexible pipe, which is usually set to be at least 20 years. In particular there is a desire for improved fatigue strength of steel in flexible unbonded pipes for use as risers in deep water applications.

The object of the invention is to provide an unbonded flexible pipe with at least one armoring layer comprising elongate armoring elements of steel, which steel has a high fatigue strength and a good weldability, while simultaneously having a high corrosion strength, being economically feasible for use in unbonded flexible pipes for transporting aggressive hydrocarbons, such as crude oil and gas, and in particular unbonded flexible pipes for dynamic applications e.g. as risers.

This object has been solved by the invention as defined in the claims and as described herein.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

All features of the inventions including ranges and preferred ranges can be combined in various ways within the scope of the invention, unless there are specific reasons not to combine such features.

The unbonded flexible pipe of the invention comprises an inner sealing sheath defining a bore and at least one armoring layer comprising metal, wherein the metal of the armoring layer is manganese steel with a composition comprising in mass % of the total steel composition about 9-30% manganese (Mn)
about 1-4% aluminum (Al)
about 0-6% silicium (Si)

about 0-4% copper (Cu)
about 0-4% nickel (Ni)
about 0-1% carbon (C)
the remainder is iron and impurities.

The unbonded flexible pipe of the invention has shown to be particularly useful for offshore applications, for example for transporting hydrocarbons, such as crude oil and gas.

Although manganese is an austenitizer in stainless steel which is generally known to reduce the corrosion resistance of steel and therefore has hereto fore not been desired to have in amounts exceeding 6% by mass when the steel is for use in offshore pipes, it has surprisingly been found that this manganese steel with the specific composition described above in fact has a very good corrosion resistance.

Further, the manganese steel has shown to increase the life of unbonded flexible pipe due to its high fatigue strength a good weldability. The risk of wire or strip break has accordingly be reduced compared to state of the art wire and strips of similar weight, alternatively the weight of the unbonded flexible pipe can be reduced by reducing the weight per length unit of the one or more wires/strips of the prior art.

As it is well known in the art the metal containing armoring layers of an unbonded flexible pipe are usually made from strips and or wires which are helically wound. Although the terms "strips" and "wires" in the following are used in plural, it should be understood that an armoring layer of the unbonded flexible pipe can have only one strip/wire, optionally it consists of the helically wound wire or strip or it may additionally comprises elements of other materials.

Usually a flexible pipe should have a life time for 20 years or more. For unbonded flexible pipes which are used in dynamic applications e.g. as risers and/or jumpers, this requirement is often difficult or at least expensive to fulfill and requires balancing between weight and durability, because an increase the amount of armoring metal is likely to increase durability, but simultaneously weight will be increased.

Since the unbonded flexible pipe often will be applied at deep water and in long lengths e.g. 50 m or longer, even in lengths of up to 2 or 3 kilometers or more, it is generally important that the weight is kept sufficiently low as a too high weight may rupture the pipe during deployment and furthermore the transportation of the weight will also add to cost beyond the cost of the metal itself.

By the unbonded flexible pipe of the invention the weight of the armoring layer can be reduced while maintaining high durability and strength.

Furthermore, as mentioned above due to the long length of the unbonded flexible pipe it is necessary to weld sections of strips/wires together to obtain sufficient lengths thereof for the strips/wires to be helically wound from one end to the other end of the unbonded flexible pipe. Often such welding spots constitute weak points of a welded wire. However, the manganese steel with the specified composition has shown to have a very good welding strength which further adds to the durability of the unbonded flexible pipe of the invention.

All percentages in this disclosure are % by mass unless otherwise specified.

In one embodiment the manganese steel with a composition comprising in mass % of the total steel composition
about 12-25% manganese (Mn)
about 1.5-3% aluminum (Al)
about 1.7-4% silicium (Si)
about 0-1% copper (Cu)+nickel (Ni)+0-1% carbon (C)
the remainder is iron and impurities.

This composition of the manganese steel has shown to have the combined properties high tensile strength, low weight (density) and low cost.

The low cost is mainly due to the low amount of the costly components Cu and Ni. However, since the manganese steel also has good formability and weldability, these properties also lead to reduced cost when using the manganese steel.

In one embodiment the manganese steel is steel with a composition as described in U.S. Pat. No. 7,806,165. When used in the unbonded flexible pipe of the invention this steel has shown to have a very high fatigue and high tensile strength, which makes it useful even when the unbonded flexible pipe is subjected to very dynamic environment.

Fatigue may fore example be tested according to ASTM E606 (Fatigue Standards and Fracture Standards) and/or ASTM A370.

In one embodiment the amount of manganese in the manganese steel in mass % is about 12-25%, such as about 15-25%, such as about 18-24%. Surprisingly the steel with this high Mn amount has a very high corrosion resistance which in fact is sufficiently high for the steel to be used in armoring layer(s) of the unbonded flexible pipe of the invention. As mentioned such offshore pipes are used for transportation of highly aggressive fluids which often comprise high amounts of $H_2S$ as well as other corrosive components.

Al is a relatively light material, but a too large amount of Al may reduce strength of the manganese steel. The amount of Al should therefore not exceed 4% by mass. The Al also has the function of stabilizing the austenite phase of the manganese steel. In one embodiment the amount of aluminum (Al) in the manganese steel in mass % is about 1.5-3%, such as about 1.7-2.8%, such as about 2-2.5%.

In one embodiment the manganese steel does not comprise any functional silicium, i.e. only traces of silicium are present in an amount which has no detectable functional effect on the steel.

In one embodiment the manganese steel comprises at least about 1% by mass of silicium. The silicium has shown to lower the density of the manganese steel while simultaneously improving the processability of the manganese steel. The silicium containing manganese steel has shown to be easily cold-workable, in particular easily deep-drawable without reducing the strength and corrosive resistance of the manganese steel. In one embodiment the amount of silicium (Si) in the manganese steel in mass % is about 1.5-4%, such as about 2-3%, such as about 2.3-2.8%.

In one embodiment the manganese steel is as described in U.S. Pat. No. 6,387,192. This steel is easily processed and has a density down to about 7 $g/cm^3$, and further this steel has shown to be very corrosive resistant.

In one embodiment the total amount of aluminum (Al)+silicium (Si) in the manganese steel in mass % is about 4% or more, such as about 5% or more, such as about 5-8%, such as about 5-7%. This manganese steel has shown to have a very high tensile strength while simultaneously having a low density.

The amount of carbon (C) should preferably be kept relatively low. In one embodiment the amount of carbon (C) in the manganese steel in mass % is about 0.1% or less, such as about 0.06% or less, such as about 0.01% or less, such a essentially 0.

For cost reasons it is desired to keep the amount of Cu and Ni at a minimum. In one embodiment the total amount of copper (Cu) and nickel (Ni) in the manganese steel in mass % is about 1% or less, such as about 0.5% or less, such as about 0.1% or less, such as essentially 0.

Generally it is desired to keep the amount of impurities at a low level. In one embodiment the amount of impurities in mass % is up to about 1%, such as up to about 0.5%, such as up to about 0.1%.

A low amount of phosphor has shown to have a positive influence on the weldability of the manganese steel and in particular the fatigue properties for spot welds. The manganese steel therefore preferably comprises at least about 0.005% by mass, such as at least about 0.01% by mass of Phosphor.

In one embodiment the impurities of the manganese steel comprise phosphor (P) in an amount in mass % of up to about 0.15% of the total steel composition, such as up to about 0.1% of the total steel composition, such as up to about 0.05% of the total steel composition, such as up to about 0.01% of the total steel composition.

Small amounts of boron can be added to increase hot workability of the manganese steel. In one embodiment the impurities of the manganese steel comprise boron (B) in an amount in mass % of up to about 0.01% of the total steel composition, such as up to about 0.005% of the total steel composition.

Small amounts of nitrogen may precipitates nitrides with Al to thereby increase the strength of the material. However, the amount of nitrides should be kept low. In one embodiment the impurities of the manganese steel comprise nitrogen (N) in an amount in mass % of up to about 0.03% of the total steel composition, such as up to about 0.1% of the total steel composition, such as up to about 0.05% of the total steel composition, such as up to about 0.01% of the total steel composition.

In one embodiment the impurities of the manganese steel comprise titanium (Ti) in an amount in mass % of up to about 0.15% of the total steel composition, such as up to about 0.1% of the total steel composition, such as up to about 0.05% of the total steel composition, such as up to about 0.01% of the total steel composition. Ti may improve strength, but is generally costly.

In one embodiment the impurities of the manganese steel comprise niobium (Nb) in an amount in mass % of up to about 0.15% of the total steel composition, such as up to about 0.1% of the total steel composition, such as up to about 0.05% of the total steel composition, such as up to about 0.01% of the total steel composition. Nb may improve strength, but is generally costly.

In one embodiment the impurities of the manganese steel comprises vanadium (V) in an amount in mass % of up to about 0.15% of the total steel composition, such as up to about 0.1% of the total steel composition, such as up to about 0.05% of the total steel composition, such as up to about 0.01% of the total steel composition. V can be added for improving the ductility of the manganese steel.

Chromium (Cr) is a very active element and it may react with other elements to form intermetallic precipitation which in the manganese steel of the unbonded flexible pipe of the invention is not desired. Therefore it is generally desired to keep the amount of Cr at a low level. In one embodiment the impurities of the manganese steel comprise chromium (Cr) in an amount in mass % of up to about 0.15% of the total steel composition, such as up to about 0.1% of the total steel composition, such as up to about 0.05% of the total steel composition, such as up to about 0.01% of the total steel composition.

The manganese steel may in practice be produced using any known methods such as in an electric arc furnace wherein a melt with the desired composition is formed.

Thereafter the molten material may be transferred to a decarbonization vessel, where the carbon levels are reduced. Further alloying additives may be added. Thereafter the molten material may be cast either into ingots or continually cast into a slab or billet form. Then the material may be shaped by hot rolling, cold rolling, drawing or deep drawing into its final form, e.g. as strips or wires.

In one embodiment, the material is subjected to a final annealing to obtain maximum softness and ductility by heat treatment which also produces a homogeneous structure: An annealing relieves stresses that may have built up in the material e.g. during cold working and ensures maximum corrosion resistance. Annealing can produce scale on the surface that must be removed by pickling (an acid wash that removes furnace scale from annealing).

The various methods of producing and shaping the steel are well known in the art.

The steel may preferably be shaped as wires or strips. The shape of such wires and strips used for forming armors of flexible unbonded pipes are well known. Examples can be found in U.S. Pat. No. 6,691,743, U.S. Pat. No. 6,668,867, U.S. Pat. No. 5,813,439, WO 0242674, U.S. Pat. No. 5,730, 188, U.S. Pat. No. 6,354,333, U.S. Pat. No. 4,549,581, U.S. Pat. No. 6,192,941, U.S. Pat. No. 6,283,161, WO 0181809 and WO 0036324, which are hereby incorporated by reference.

In one embodiment the manganese steel is in the form of one or more wires or strips which is/are helically wound, the wire(s) is/are produced by a method comprising hot rolling and/or cold rolling, preferably cold rolling at a temperature of from about 10° C. to about 50° C.

Hot rolling and cold rolling are well known processes in the art. The wires/strips may for example be produced by a process which comprises both hot rolling and cold rolling, wherein the cold rolling is performed after the hot rolling.

The manganese steel in the unbonded flexible pipe of the invention is highly suitable for cold forming.

In one embodiment the manganese steel is in the form of one or more wires or strips which is/are helically wound, the wire(s) is/are produced by a method comprising cold forming, preferably cold deep-drawing.

In one embodiment the manganese steel is in the form of one or more wires or strips which is/are helically wound, the wire(s) is/are produced by a method comprising annealing. Although recrystallization and/or stress relief is not required when working the manganese steel of the unbonded flexible pipe of the invention, the annealing may e.g. be performed for recrystallization and/or for stress relief.

In one embodiment the manganese steel is in the form of one or more wires or strips which is/are helically wound, the wire(s) is/are produced by a method comprising quenching. Quenching is well known in the art. The quenching may e.g. be performed in an inline operation e.g. in a bath. In one embodiment the quenching comprises heat treating the shaped or preshaped wire/strip comprising passage into an austenitizing furnace at a temperature of 800° C. or higher, preferably 900° C. or higher, followed by fast cooling in a bath e.g. a lead bath at 400-500° C.

In one embodiment the manganese steel is in the form of one or more wires or strips which is/are helically wound, the wire(s) is/are produced by a method comprising patenting.

Patenting of steel is well known in the art and generally comprises heat-treating to an austeniting (annealing) phase followed by quenching to a lower temperature, such as about 400 to about 500° C. The quenching may preferably be an isothermal quenching at a temperature of about 500° C.

Several methods of patenting steel are known in the art such as the methods described in U.S. Pat. No. 5,213,637 and U.S. Pat. No. 4,168,995.

Steel which is adapted for patenting preferably comprises at least about 0.01% by mass of C or more, such as up to about 0.1% by mass.

In one embodiment the manganese steel is in the form of one or more wires or strips which is/are helically wound, the wire(s) is/are produced by a method comprising work hardening.

The work hardening may e.g. correspond to the method described in U.S. Pat. No. 6,282,933. Other methods are well known in the art.

The manganese steel is preferably in form of one or more wires and/or one or more strips which are helically wound to constitute or form part of an armoring layer of the unbonded flexible pipe.

As mentioned the unbonded flexible pipe comprises an inner sealing sheath. The inner sheath is the innermost sealing sheath forming a barrier against fluids transported in the pipe and which defines the bore through which the fluid can be transported. The unbonded flexible pipe has a centre axis, which is the central axis of the bore. Usually the bore will be substantially circular in cross-section, but it may also have other shapes, such as oval.

The inner sealing sheath may preferably be a polymer. Inner sealing sheaths of polymers and combinations of polymers as well as polymers combined with other materials are well known in the art and comprise for example PEX (cross linked polyethylene), polyaminde-11 (PA) and polyvinylidene fluoride (PVDF) optionally combined with a foil or film layer.

The unbonded flexible pipe of the invention may in principle have any size and length, as it is generally known in the art. Generally such unbonded flexible pipes are of a relatively large dimension, e.g. with inner diameters larger than 2.5 inches (6.5 cm), such as at least 4 inches (10.5 cm) or larger, such as at least 6 inches (15.7 cm) or larger, such as at least 8 inches (20.9 cm) or larger, such as between 10 inches (26.2 cm) and 20 inches (52.3 cm), such as between 11 inches (28.8 cm) and 18 inches (47.1 cm).

The unbonded flexible pipe of the invention preferably comprises three or more unbonded layers including an internal inner sealing sheath, surrounded by two or more outer armoring layers, preferably at least one of the outer armoring layers being the manganese steel described above.

In one embodiment, the unbonded flexible pipe comprises an outer sheet surrounding one or more outer armoring layers. The outer sheath may be permeable to gasses and/or liquid. In one embodiment, the outer sheath is liquid tight in order to prevent the ingress of sea water in use.

Such outer sheaths are well known in the art and may e.g. be of a thermoplastic or termoset material, such as polyethylene (PE) and polyamide (PA), (e.g. nylon 6, nylon 11 or other) and other e.g. as disclosed as materials for outer sheaths in U.S. Pat. No. 4,706,713 and WO 03083344 incorporated by reference.

In general unbonded flexible pipes are divided into two main groups a) flow lines used for transporting fluids along the seabed at seabed level, and b) risers used for transporting fluids from the seabed level to a higher level e.g. to an installation or a ship at sea surface level.

In one embodiment the unbonded flexible pipe of the invention is a riser.

In one embodiment the unbonded flexible pipe of the invention is a flow line.

The requirement of the outer armoring layers of a flexible pipe depends largely on the use of the pipe. Use on deeper water normally requires higher strength. The same accounts for use at shallow waving water, in particular if the pipe is a riser.

The requirement of the material of armoring layers with respect to corrosion resistance is normally very high, and metals with low corrosion resistance are generally unsuitable for use in unbonded flexible pipes for offshore application.

The unbonded flexible pipe of the invention may preferably comprise an inner armoring layer (carcass) inside the inner sealing sheath.

The use of such inner armoring layer is well known in the art. In use the inner armoring layer of an unbonded flexible pipe is subjected to the fluid which is transported in the pipe. When the pipe is to be used for transporting aggressive and corrosive fluids such as crude oil, $H_2S$ and similar, the material of the inner armoring layer needs to be highly resistive to corrosion.

Simultaneously the inner armoring layer is subjected to very high forces from the sea water pressing onto the pipe. As long as the pressure inside the pipe is equal to the pressure outside the pipe, the resulting pressure is not to high, but generally there will always be a difference between the inner pressure (inside the pipe) and the outer pressure (outside the pipe), in particular during deployment, installation and start up of production. An unbonded flexible pipe for use at deep water, such as about 1000 meters or deeper, is therefore normally equipped with an inner armoring layer in order to prevent collapse of the pipe due to the outer pressure onto the pipe.

In one embodiment the unbonded flexible pipe comprises an inner armoring layer of the manganese steel described above. Surprisingly the manganese steel has a high corrosion resistance even when transporting crude oil and gas.

By providing that all or a large part of the steel of the armoring layer(s) of the unbonded flexible pipe is a manganese steel with the composition described above, the weight of the pipe can be reduced while maintaining strength and resistance towards corrosion. Furthermore cost can be reduced compared to using for example Ni-steel or other expensive steel types which are often used in such unbonded flexible pipe in order to ensure the combination of high strength and high corrosion resistance.

The unbonded flexible pipe of the invention may in one embodiment comprise an inner armoring layer and two or more outer armoring layers, wherein the two armoring layers are of wound wires and optionally helically wound elongate elastomer elements. The layers are preferably cross wound at angles of 30-60. Preferably two or more of the armoring layers including the inner armoring layer are of the manganese steel described above.

The unbonded flexible pipe of the invention may in one embodiment comprise an inner armoring layer and three or more outer armoring layers, wherein the inner most of the outer armoring layers is a vault of wound wires, wound at a steep angle to the centre axis of the pipe, e.g. above 80 degree, and the other two armoring layers are of wound wires and optionally helically wound elongate elastomer elements. The layers are preferably cross wound at angles of 25-40 degrees. Preferably two or more, such as all of the armoring layers including the inner armoring layer, are of the manganese steel described above.

The unbonded flexible pipe of the invention may comprise other layers such as it is well known in the art, e.g.

insulation layers of polymers, composite, cork or other, intermediate polymer sheaths or films and etc.

The unbonded flexible pipe of the invention may have a structure as described in any one of the prior art documents U.S. Pat. No. 6,691,743, U.S. Pat. No. 6,668,867, U.S. Pat. No. 5,813,439, WO 0242674, U.S. Pat. No. 5,730,188, U.S. Pat. No. 6,354,333, U.S. Pat. No. 4,549,581, U.S. Pat. No. 6,192,941, U.S. Pat. No. 6,283,161, WO 0181809, WO 0036324, U.S. Pat. No. 6,454,897, U.S. Pat. No. 6,408,891 and U.S. Pat. No. 6,110,550, with the difference that at least one of the armoring layers is made from the manganese steel described above.

In one embodiment of the unbonded flexible pipe of the invention, the one or more armoring layers of the manganese steel have an average material thickness of between 0.4 and 20 mm, preferably between 0.6 and 15 mm, such as between 8 and 12 mm.

The thickness depends largely on which type of armor layer is in question and how it should be formed. As mentioned above, it is generally known to provide the armor layers from wirers and/or strips which are wound to form the armor layer(s). Thus, in one embodiment at least one armoring layer of the low Ni duplex steel is made from wires or strips, which have preferably been wound.

In one embodiment of the unbonded flexible pipe, at least one armoring layer of manganese steel is made from wire(s), which preferably each have a profile so that adjacent windings of the wire(s) is/are mechanically interconnected. This armor layer may preferably be an outer armor layer, but it may also be an inner armoring layer, where the wire(s) preferably has/have K-profile or I-profile.

In one embodiment, the inner armoring layer is made from interconnected wires wherein the wires have a K profile as disclosed in WO 0181809.

In one embodiment wherein the armor layer is made from or comprises manganese steel wires, the wires preferably have an average material thickness of between 1.5 and 15 mm, preferably between 2 and 10 mm. The width of the wires may e.g. be between 7 and 20 mm.

In one embodiment of the unbonded flexible pipe of the invention, at least one armoring layer comprising manganese steel is made from or comprises strips of manganese steel which have been folded and wound, preferably the folded strips are mechanically interconnected. Preferably the inner armoring layer is made from folded and mechanically interconnected strips.

The strips may preferably be folded to have a cross section shaped as a lying S (an endless lying S shape) as it is well known. The strip preferably has an average material thickness of between 0.5 and 5 mm, such as between 0.6 and 3 mm. The material thickness is the thickness of the material in an unfolded condition. When unfolded the strips may preferably have a width of 35-180 mm. When folded as a lying S, the width (corresponding to the height of the S) may preferably be between ¼ and ½ of the unfolded width.

The invention also relates to the use of the manganese steel described above for the production of an armoring layer of a flexible pipe comprising at least one unbonded armoring layer and at least one unbonded inner sealing sheath wherein the manganese steel comprises in mass % of the total steel composition
about 9-30% manganese (Mn)
about 1-4% aluminum (Al)
about 0-6% silicium (Si)
about 0-4% copper (Cu)
about 0-4% nickel (Ni)
about 0-1% carbon (C)
the remainder is iron and impurities.

The invention is defined by the features of the independent claim(s). Preferred embodiments are defined in the dependent claims. Any reference numerals in the claims are intended to be non-limiting for their scope.

BRIEF DESCRIPTION OF DRAWINGS

In the following embodiments of the invention are described with reference to the drawings and examples. These embodiments are only examples and should not be interpreted to make any limitation to the scope of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The figures are schematic and simplified for clarity, and they just show details which are essential to the understanding of the invention, while other details are left out. Throughout, the same reference numerals are used for identical or corresponding parts.

Figure 1:
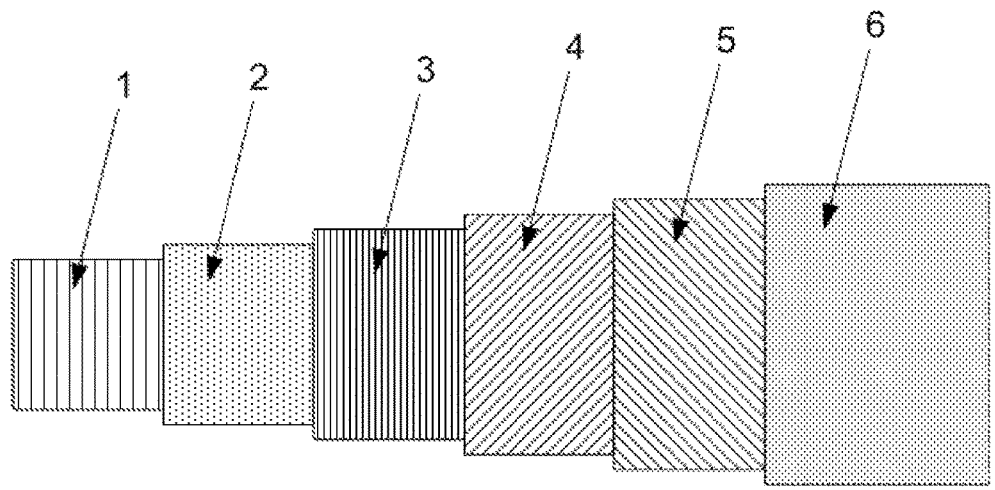
FIG. 1 shows an unbonded pipe with a carcass (an inner armoring layer).

The unbonded flexible pipe shown in FIG. 1 comprises an internal inner sealing sheath 2 also called an inner liner, e.g. of cross linked PE. Inside the inner liner 2 the pipe comprises an inner armoring layer 1, called a carcass. On the outer side of the inner liner 2, the unbonded flexible pipe comprises three outer armoring layers 3, 4, 5. The inner armoring layer 3 closest to the inner liner 2 is a pressure armoring layer 3 made from wires wound at a steep angle to the centre axis of the pipe, e.g. close to 90 degrees. Around the pressure armoring layer 3, the pipe comprises a pair of cross wound tensile armoring layers 4, 5 made from wound wires, wherein one of the tensile armoring layers 4 has an angle above 55 degree, typically between 60 and 75 degrees, and wherein the other one of the tensile armoring layers 5 has an angle below 55 degree, typically between 30 and 45 degrees.

At least one of the armoring layers 2, 3, 4, 5 is made from or comprises manganese steel with the composition described above. Preferably at least the carcass 2 is made from manganese steel with the composition described above.

Figure 2:
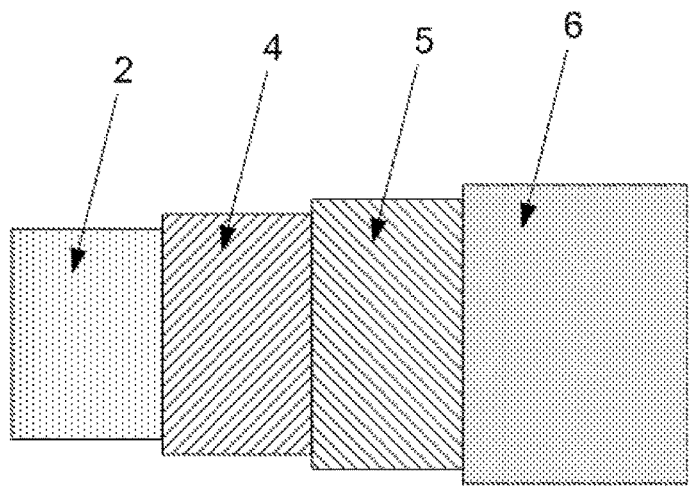
FIG. 2 shows an unbonded pipe without a carcass.

FIG. 2 shows another pipe design. This unbonded flexible pipe comprises an inner liner 12 and a pair of outer armoring layers, 14, 15, in the form of wires wound around the inner liner 12. The two armor layers are cross wound at an angle to the centre axis of the pipe of close to 55 degree, typically one of the layers is wound at an angle slightly less than 55 degrees, e.g. between 52 and 55 degrees and the other is wound at an angle slightly more than 55 degrees e.g. between 55 and 57.

At least one of the armoring layers 14, 15 is made from or comprises manganese steel with the composition described above. Preferably both of the armoring layers 14, 15 are made from manganese steel with the composition described above. In one embodiment one or more elastomer elongate elements, e.g. of rubber, are helically wound between windings of helically wound wires of manganese steel.

Figure 3:
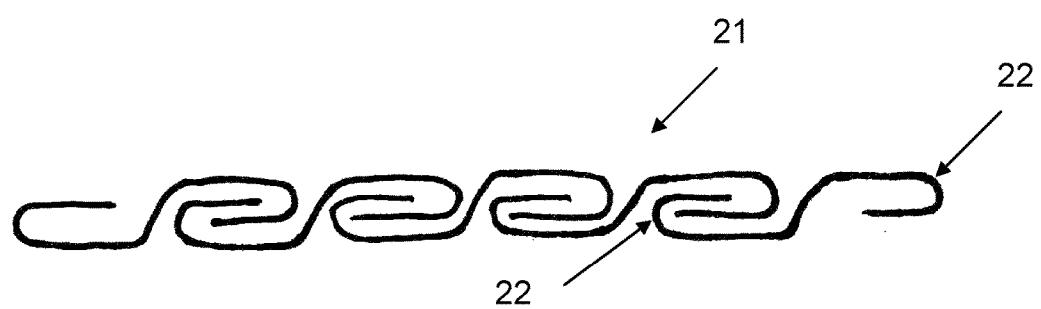
FIG. 3 shows a schematic side view of a folded and wound strip.

FIG. 3 illustrates the folding and winding of a strip to become a carcass. The strip is preferably of manganese steel and is folded to an endless lying S shape 21. The heads of the S are mechanically interlocked in adjacent windings as the folded strip is wound to form a pipe shape. The carcass may be formed from one folded strip or from two or more strips, which are wound and mechanically interlocked.

EXAMPLES

The following are examples of preferred manganese steel compositions for use in the present invention.

| Composition No. | Chemical composition in % by mass - balance is Fe | | | | | | | | | |
|---|---|---|---|---|---|---|---|---|---|---|
| 1 | Mn | Si | Al | C | Ni | S | P | Nb | Ti | N |
| 2 | 29.4 | 3 | 3.3 | 0.0049 | — | 0.0033 | — | — | — | — |
| 3 | 24 | 2 | 3 | 0.06 | 1 | — | — | — | — | — |
| 4 | 24.4 | 3.49 | 1.64 | — | — | 0.016 | 0.004 | 0.029 | 0.019 | 0.0039 |
| 5 | 9 | 4 | — | 0.05 | 0.5 | — | 0.004 | 0.3 | — | — |
| 6 | 15 | 2.5 | 2.5 | 0.7 | — | — | — | — | — | — |
| 7 | 18 | 2.5 | 2.5 | 0.4 | — | — | — | — | — | — |
| 8 | 22 | 5 | 1 | 0.5 | — | — | — | — | — | — |

What is claimed is:

1. An unbonded flexible pipe for offshore applications, the pipe comprises an inner sealing sheath defining a bore and at least one armoring layer comprising metal, wherein the metal of the armoring layer is manganese steel with a composition comprising in mass % of the total steel composition
   about 9-30% manganese (Mn)
   about 1-4% aluminum (Al)
   about 1-6% silicium (Si)
   about 0-4% copper (Cu)
   about 0-4% nickel (Ni)
   about 0-1% carbon (C)
   the remainder is iron and impurities,
      wherein the amount of impurities in mass % is up to about 1%, and
      wherein the impurities comprise phosphor (P) in an amount in mass % of up to about 0.15% of the total steel composition.

2. An unbonded flexible pipe as claimed in claim 1, wherein the manganese steel comprises in mass % of the total steel composition
   about 12-25% manganese (Mn)
   about 1.5-3% aluminum (Al)
   about 1.7-4% silicium (Si)
   about 0-1% copper (Cu)+nickel (Ni)+0-1% carbon (C)
   the remainder is iron and impurities.

3. An unbonded flexible pipe as claimed in claim 1, wherein the amount of manganese (Mn) in the manganese steel in mass % is about 18-24%.

4. An unbonded flexible pipe as claimed in claim 1, wherein the total amount of aluminum (Al)+silicium (Si) in the manganese steel in mass % is about 4% or more.

5. An unbonded flexible pipe as claimed in claim 1, wherein the amount of carbon (C) in the manganese steel in mass % is about 0.1% or less.

6. An unbonded flexible pipe as claimed in claim 1, wherein the total amount of copper (Cu)+nickel (Ni) in the manganese steel in mass % is about 1% or less.

7. An unbonded flexible pipe as claimed in claim 1, wherein the impurities comprise boron (B) in an amount in mass % of up to about 0.01% of the total steel composition.

8. An unbonded flexible pipe as claimed in claim 1, wherein the impurities comprise nitrogen (N) in an amount in mass % of up to about 0.03% of the total steel composition.

9. An unbonded flexible pipe as claimed in claim 1, wherein the impurities comprise titanium (Ti) in an amount in mass % of up to about 0.15% of the total steel composition.

10. An unbonded flexible pipe as claimed in claim 1, wherein the impurities comprise niobium (Nb) in an amount in mass % of up to about 0.15% of the total steel composition.

11. An unbonded flexible pipe as claimed in claim 1, wherein the impurities comprise vanadium (V) in an amount in mass % of up to about 0.15% of the total steel composition.

12. An unbonded flexible pipe as claimed in claim 1, wherein the impurities comprise chromium (Cr) in an amount in mass % of up to about 0.15% of the total steel composition.

13. An unbonded flexible pipe as claimed in claim 1, wherein the manganese steel is in the form of at least one wire or strip which is helically wound, the wire is produced by a method comprising hot rolling and/or cold rolling.

14. An unbonded flexible pipe as claimed in claim 1, wherein the manganese steel is in the form of at least one wire or strip which is helically wound, the wire is produced by a method comprising cold forming.

15. An unbonded flexible pipe as claimed in claim 1, wherein the manganese steel is in the form of at least one wire or strip which is helically wound, the wire is produced by a method comprising annealing.

16. An unbonded flexible pipe as claimed in claim 1, wherein the manganese steel is in the form of at least one wire or strip which is helically wound, the wire is produced by a method comprising quenching.

17. An unbonded flexible pipe as claimed in claim 1, wherein the manganese steel is in the form of at least one wire or strip which is helically wound, the wire is produced by a method comprising patenting.

18. An unbonded flexible pipe as claimed in claim 1, wherein the manganese steel is in the form of at least one wire or strip which is helically wound, the wire is produced by a method comprising work hardening.

19. An unbonded flexible pipe as claimed in claim 1, wherein the manganese steel is in the form of at least one wire which is helically wound, the wound wire has an average thickness determined in radial direction of the pipe which is of between about 0.4 and about 20 mm.

20. An unbonded flexible pipe as claimed in claim 1, wherein the manganese steel is in the form of at least one strip which is folded and mechanically interconnected and which is helically wound.

21. An unbonded flexible pipe as claimed in claim 1, wherein the at least one armoring layer comprising manganese steel is an inner armoring layer arranged inside the inner sealing sheath or an outer armoring layer arranged outside the inner sealing sheath.

22. An unbonded flexible pipe as claimed in claim 21, wherein the at least one armoring layer comprising manganese steel is an outer armoring layer arranged outside the inner sealing sheath and wound with an angle to the center axis of the pipe which is about 60° G or less.

23. A method of producing an unbounded flexible pipe, wherein the unbounded flexible pipe comprising at least one unbonded armoring layer and at least one unbonded inner sealing sheath, the method comprising producing the at least one armoring layer using a manganese steel having a composition which comprises in mass % of the total steel composition about 9-30% manganese (Mn)
about 1-4% aluminum (Al)
about 1-6% silicium (Si)
about 0-4% copper (Cu)
about 0-4% nickel (Ni)
about 0-1% carbon (C)
the remainder is iron and impurities,
   wherein the amount of impurities in mass % is up to about 1%, and
   wherein the impurities comprise phosphor (P) in an amount in mass % of up to about 0.15% of the total steel composition.

\* \* \* \* \*

UNITED STATES PATENT AND TRADEMARK OFFICE
CERTIFICATE OF CORRECTION

Page 1 of 1

PATENT NO. : 10,001,228 B2
APPLICATION NO. : 14/125349
DATED : June 19, 2018
INVENTOR(S) : Soren Gundstrup It is certified that error appears in the above-identified patent and that said Letters Patent is hereby corrected as shown below:

In the Claims

Column 13, Line 10, "60° G or less." should be -- 60° or less. --.

Signed and Sealed this
Eighteenth Day of September, 2018

Andrei Iancu
*Director of the United States Patent and Trademark Office*